US012621631B2

(12) United States Patent
  Alnås

(10) Patent No.: US 12,621,631 B2
(45) Date of Patent: May 5, 2026

(54) DNS LOOKUP CONTROL FOR EDGE SERVICES

(71) Applicant: Sony Group Corporation, Tokyo (JP)

(72) Inventor: Svante Alnås, Lund (SE)

(73) Assignee: Sony Group Corporation, Tokyo (JP)

( * ) Notice: Subject to any disclaimer, the term of this patent is extended or adjusted under 35 U.S.C. 154(b) by 299 days.

(21) Appl. No.: 18/283,639

(22) PCT Filed: Feb. 23, 2022

(86) PCT No.: PCT/EP2022/054478
  § 371 (c)(1),
  (2) Date: Sep. 22, 2023

(87) PCT Pub. No.: WO2022/214236
  PCT Pub. Date: Oct. 13, 2022

(65) Prior Publication Data
  US 2024/0171936 A1 May 23, 2024

(30) Foreign Application Priority Data
  Apr. 6, 2021 (SE) .................................... 2150429-5

(51) Int. Cl.
  *H04W 4/021* (2018.01)
  *H04L 61/4511* (2022.01)
  *H04W 76/11* (2018.01)

(52) U.S. Cl.
  CPC ......... *H04W 4/021* (2013.01); *H04L 61/4511* (2022.05); *H04W 76/11* (2018.02)

(58) Field of Classification Search
  CPC ....... H04W 4/021; H04W 76/11; H04W 4/02; H04W 76/19; H04L 61/4511
  See application file for complete search history.

(56) References Cited

U.S. PATENT DOCUMENTS

| | | | | |
|---|---|---|---|---|
| 9,515,980 B2 * | 12/2016 | Eggleston | ........... | H04L 61/4511 |
| 9,553,930 B2 * | 1/2017 | Carney | ................. | H04L 45/021 |
| 9,923,959 B2 * | 3/2018 | Flavel | ................. | H04L 61/4511 |

(Continued)

FOREIGN PATENT DOCUMENTS

| | | | | | |
|---|---|---|---|---|---|
| AU | 2022222985 A1 | * | 9/2023 | .......... | H04L 61/4511 |
| CN | 102148752 A | * | 8/2011 | ............. | H04L 67/63 |

(Continued)

OTHER PUBLICATIONS

International Search Report and Written Opinion from corresponding International Application No. PCT/EP2022/054478, mailed on Jun. 3, 2022, 15 pages.

(Continued)

*Primary Examiner* — Michael A Keller
(74) *Attorney, Agent, or Firm* — Tucker Ellis LLP

(57) ABSTRACT

Method for use in a User Equipment, UE, for obtaining connection to an Edge server, the method comprising: initiating establishment of a Protocol Data Unit, PDU, session with a wireless network; transmitting, to the wireless network during the establishment, a first message indicating UE support for Edge-aware Domain Name System, DNS, lookup; receiving, from the wireless network during the establishment, a second message comprising an address to a DNS server configured to provide an address to the Edge server.

13 Claims, 3 Drawing Sheets

(56)  References Cited

U.S. PATENT DOCUMENTS

| | | | | |
|---|---|---|---|---|
| 9,961,164 | B2 * | 5/2018 | Carney | H04L 61/4511 |
| 10,666,602 | B2 * | 5/2020 | Tuliani | H04L 61/4511 |
| 10,666,613 | B2 * | 5/2020 | Knecht | H04L 67/1017 |
| 11,290,548 | B2 * | 3/2022 | Ppallan | H04L 67/56 |
| 11,356,404 | B2 * | 6/2022 | Zhang | H04L 67/1001 |
| 11,563,713 | B2 * | 1/2023 | Feng | H04W 8/26 |
| 11,570,145 | B2 * | 1/2023 | Gundavelli | H04L 61/4511 |
| 11,729,137 | B2 * | 8/2023 | Lee | H04L 61/4541 |
| | | | | 709/245 |
| 11,870,844 | B2 * | 1/2024 | Salkintzis | H04W 4/021 |
| 11,924,163 | B2 * | 3/2024 | Shan | H04L 67/566 |
| 11,929,977 | B2 * | 3/2024 | Dao | G06F 16/953 |
| 11,949,647 | B2 * | 4/2024 | Knecht | H04L 67/1031 |
| 11,962,656 | B2 * | 4/2024 | Ppallan | H04L 61/4511 |
| 11,979,367 | B2 * | 5/2024 | Zhang | H04L 67/51 |
| 11,991,145 | B2 * | 5/2024 | Lee | H04L 67/51 |
| 12,184,606 | B2 * | 12/2024 | Lee | H04L 61/4541 |
| 12,231,894 | B2 * | 2/2025 | Rajadurai | H04W 12/106 |
| 12,278,862 | B2 * | 4/2025 | Salkintzis | H04L 67/52 |
| 12,289,288 | B2 * | 4/2025 | Hoffmann | H04L 61/4511 |
| 12,388,903 | B2 * | 8/2025 | Mas Rosique | H04L 67/51 |
| 12,452,204 | B2 * | 10/2025 | Tang | H04L 67/55 |
| 12,500,860 | B2 * | 12/2025 | Mas Rosique | H04L 61/4511 |
| 2006/0253609 | A1 * | 11/2006 | Andreev | H04L 61/4552 |
| | | | | 709/245 |
| 2011/0145420 | A1 * | 6/2011 | Kakadia | H04L 67/1027 |
| | | | | 709/227 |
| 2014/0149552 | A1 * | 5/2014 | Carney | H04L 45/02 |
| | | | | 709/219 |
| 2014/0297870 | A1 * | 10/2014 | Eggleston | H04L 61/5007 |
| | | | | 709/226 |
| 2014/0355542 | A1 | 12/2014 | Zhang | |
| 2015/0326665 | A1 * | 11/2015 | Carney | H04L 67/60 |
| | | | | 709/219 |
| 2015/0358401 | A1 * | 12/2015 | Flavel | H04L 69/321 |
| | | | | 370/235 |
| 2017/0295132 | A1 * | 10/2017 | Li | H04L 61/3015 |
| 2018/0324137 | A1 * | 11/2018 | Tuliani | H04L 61/4511 |
| 2021/0281537 | A1 * | 9/2021 | Zhang | H04L 67/1001 |
| 2022/0224761 | A1 * | 7/2022 | Ppallan | H04L 67/56 |
| 2022/0263788 | A1 * | 8/2022 | Lee | H04L 61/4511 |
| 2022/0345442 | A1 * | 10/2022 | Lee | H04L 67/10 |
| 2022/0345443 | A1 * | 10/2022 | Gundavelli | H04W 24/04 |
| 2022/0377046 | A1 * | 11/2022 | Zhang | H04L 61/4511 |
| 2022/0394088 | A1 * | 12/2022 | Salkintzis | H04L 67/56 |
| 2023/0362129 | A1 * | 11/2023 | Hall | H04L 61/58 |
| 2024/0056415 | A1 * | 2/2024 | Tang | H04L 67/10 |
| 2024/0073178 | A1 * | 2/2024 | Mas Rosique | H04L 61/4511 |
| 2024/0154931 | A1 * | 5/2024 | Tonesi | H04L 61/4511 |
| 2024/0154933 | A1 * | 5/2024 | Chen | H04L 61/4511 |
| 2024/0171632 | A1 * | 5/2024 | Salkintzis | H04L 67/56 |
| 2024/0171936 | A1 * | 5/2024 | Alnås | H04W 76/10 |
| 2024/0259341 | A1 * | 8/2024 | Zhang | H04L 67/51 |
| 2024/0283771 | A1 * | 8/2024 | Lv | H04L 61/4511 |
| 2025/0240241 | A1 * | 7/2025 | Shen | H04L 45/745 |

FOREIGN PATENT DOCUMENTS

| | | | | | |
|---|---|---|---|---|---|
| CN | 102148752 | B | * | 3/2014 | H04L 67/63 |
| CN | 114143287 | A | * | 3/2022 | H04W 76/10 |
| CN | 114424508 | A | * | 4/2022 | H04L 61/4511 |
| CN | 114586327 | A | * | 6/2022 | H04L 67/52 |
| CN | 114902634 | A | * | 8/2022 | H04L 67/147 |
| CN | 113691969 | B | * | 10/2022 | H04L 61/4511 |
| CN | 115211091 | A | * | 10/2022 | H04L 61/4511 |
| CN | 116267035 | A | * | 6/2023 | H04L 45/745 |
| CN | 116888946 | A | * | 10/2023 | |
| CN | 117099357 | A | * | 11/2023 | H04L 61/4511 |
| CN | 114424508 | B | * | 1/2024 | H04L 67/51 |
| CN | 117880248 | A | * | 4/2024 | H04L 67/51 |
| CN | 113556410 | B | * | 7/2024 | H04L 61/5007 |
| CN | 114586327 | B | * | 7/2024 | H04W 4/021 |
| CN | 118740847 | A | * | 10/2024 | H04W 4/021 |
| CN | 114143287 | B | * | 4/2025 | H04W 76/10 |
| CN | 116074383 | B | * | 11/2025 | H04W 48/17 |
| EP | 3886404 | A1 | * | 9/2021 | H04L 61/4511 |
| EP | 4044557 | A1 | * | 8/2022 | H04L 67/147 |
| EP | 3886404 | B1 | * | 4/2023 | H04L 61/255 |
| EP | 4221150 | A1 | * | 8/2023 | H04L 61/4511 |
| EP | 4274195 | A1 | * | 11/2023 | H04L 67/56 |
| EP | 4115596 | B1 | * | 4/2024 | H04L 61/4511 |
| EP | 4049467 | B1 | * | 5/2024 | H04W 4/021 |
| EP | 4362433 | A2 | * | 5/2024 | H04W 4/021 |
| EP | 4362512 | A1 | * | 5/2024 | H04W 8/14 |
| EP | 4044557 | B1 | * | 9/2024 | H04L 67/289 |
| EP | 4322497 | B1 | * | 3/2025 | H04L 67/141 |
| EP | 4111721 | B1 | * | 4/2025 | H04W 12/033 |
| EP | 4362512 | B1 | * | 10/2025 | H04W 76/10 |
| EP | 4320844 | B1 | * | 11/2025 | H04L 61/4511 |
| JP | 2022548649 | A | * | 11/2022 | H04L 61/4511 |
| JP | 7391194 | B2 | * | 12/2023 | H04L 67/51 |
| JP | 2024506961 | A | * | 2/2024 | H04L 61/4511 |
| JP | 2024529890 | A | * | 8/2024 | H04W 76/10 |
| JP | 7760698 | B2 | * | 10/2025 | H04W 76/10 |
| KR | 20210054472 | A | * | 5/2021 | H04L 67/147 |
| KR | 20220059539 | A | * | 5/2022 | H04L 61/4511 |
| KR | 20220118273 | A | * | 8/2022 | H04L 67/51 |
| KR | 102787531 | B1 | * | 3/2025 | H04L 67/289 |
| WO | WO-2012083800 | A1 | * | 6/2012 | H04L 61/4511 |
| WO | WO-2016025827 | A1 | * | 2/2016 | H04L 9/3263 |
| WO | 2021004528 | A1 | | 1/2021 | |
| WO | WO-2021052080 | A1 | * | 3/2021 | H04L 61/4511 |
| WO | WO-2021078360 | A1 | * | 4/2021 | H04L 67/52 |
| WO | WO-2021178586 | A1 | * | 9/2021 | H04L 61/4511 |
| WO | WO-2022016558 | A1 | * | 1/2022 | H04L 67/148 |
| WO | WO-2022177347 | A1 | * | 8/2022 | H04L 61/4511 |
| WO | WO-2022214236 | A1 | * | 10/2022 | H04L 61/4511 |
| WO | WO-2022240900 | A1 | * | 11/2022 | H04L 61/4511 |
| WO | WO-2023065081 | A1 | * | 4/2023 | H04L 45/745 |
| WO | WO-2025063736 | A1 | * | 3/2025 | H04L 61/4511 |

OTHER PUBLICATIONS

Office Action and Search Report from corresponding Swedish Application No. 2150429-5, mailed on Nov. 22, 2021, 9 pages.
Masaki Suzuki et al., "Enhanced DNS Support towards Distributed MEC Environment," ETSI White Paper No. 39, 1st Edition, Sep. 2020, 25 pages.

* cited by examiner

401. INITIATE PDU SESSION ESTABLISHMENT

402. TRANSMIT SUPPORT FOR EDGE AWARE DNS LOOKUP

403. RECEIVE DNS SERVER ADDRESS

404. OBTAIN CONTROL INFORMATION

405. EXPOSE DNS ADDRESS TO APPLICATION CLIENT

406. OBTAIN EAS ACCESS BASED ON CONTROL INFORMATION

DNS LOOKUP CONTROL FOR EDGE SERVICES

TECHNICAL FIELD

This disclosure relates to the field of access to Edge services provided for wireless devices connected in a wireless network. Specifically, solutions are provided for allowing Edge applications to run on wireless devices while appropriately utilizing a Domain Name System (DNS) configuration provided by an operator of the wireless network regardless of which data network is used for Edge server access.

BACKGROUND

Wireless devices may be configured according to various protocols for communication with different networks by radio communication. A wide variety of systems for radio communication are set up under the provisions of the $3^{rd}$ Generation Partnership Project (3GPP), including cellular systems and wireless local area networks often referred to as Wi-fi. The wireless devices are often referred to as User Equipment (UE), and are configured to wirelessly communicate with a network backbone via one or more access nodes. Such access nodes may be identified by different terms based on the protocol used, and in cellular communications they are often referred to as base stations.

As technology advances, and the wireless system protocols are developed, the processing and communication capability of UEs increases. A UE may be devised to carry out different tasks based on which application is run on the UE, and requirements may be different between different applications. For certain types of applications, where communication through the wireless network may be inadequate, so-called Edge computing can be used to assist proper operation of the application. Edge computing is a distributed computing paradigm that brings computation and data storage closer to the location where it is needed, i.e. closed to the UE on which an application client runs, e.g. to improve response times and save bandwidth. Edge computing may e.g. be used for latency-sensitive applications such as multiplayer video games. When using an Edge system, the application client connects to an Edge host, operated on an Edge server, also referred to as an Edge application server (EAS). Various computing tasks may then be off-loaded to the EAS.

In some instances, it is of beneficial for wireless network operators to maintain control over Edge servers the UE will connect to, e.g. for the purpose of finding the most suitable, typically the closest, EAS. Today, this could for example be done by using a DNS (Domain Name System) configuration determined by the operator. The DNS provides IP addresses associated with domain names for Edge system nodes. The DNS may identify addresses to various Edge system servers, such as one or more Edge servers, such as EASs, or higher level Edge server nodes such as Edge Configuration Server (ECS) or Edge Enabling Server (EES). An application client may provide a DNS request to access an Edge server by using its URL, and the application client will then receive a DNS response with an associated IP address.

One problem associated with the use of DNS to resolve IP addresses for Edge servers is that DNS provides time-limited IP addresses. In other words, an IP address has an associated with a Time-to-live (TTL), after which a new IP address must be obtained by means of a new DNS look-up. This does not always operate well with connection through wireless networks since it does not take UE mobility into account. Another problem associated with this setup is that a DNS response may be different dependent on through which data connection the DNS request is transmitted. If the DNS request is transmitted outside the operator network, such as through a Wi-fi connection to the Internet, a different DNS configuration may nevertheless be used, which may not need not identify the most appropriate, e.g. closest, EAS.

As a result of the current implementation to use DNS, Edge applications may not run properly.

SUMMARY

There exists a need for improvement in the art of controlling a UE with regard to Edge server access, to optimize use of Edge hosted services in a UE. A solution to this problem is set out in the independent claims.

According to a first aspect, a method is provided for use in a wireless network for facilitating access of User Equipment to an Edge server, the method comprising:

initiating establishment of a Protocol Data Unit, PDU, session with a first UE;

receiving, from the first UE during the establishment, a first message indicating UE support for Edge-aware Domain Name System, DNS, lookup;

transmitting, to the UE during the establishment, a second message comprising an address to an Edge-aware DNS server configured to provide an address to the Edge server; and controlling Edge server access based on UE presence with respect to a validity area.

According to a second aspect, a method is provided for use in a UE for obtaining connection to an Edge server, the method comprising:

initiating establishment of a PDU session with a wireless network;

transmitting, to a network node of the wireless network during the establishment, a first message indicating UE support for Edge-aware DNS lookup;

receiving, from the network node during the establishment, a second message comprising an address to a DNS server configured to provide an address to an Edge server.

By means of the proposed solution, the wireless network may configure the way the UE finds appropriate address information to access the Edge server using DNS, while considering UE mobility.

Various embodiments and detailed solutions are set out in the dependent claims and further discussed in the description below.

BRIEF DESCRIPTION OF THE DRAWINGS

The proposed solution is described in more detail below with reference to the accompanying drawings, in which various examples of realizing the solutions are outlined.

DETAILED DESCRIPTION

Figure 1:
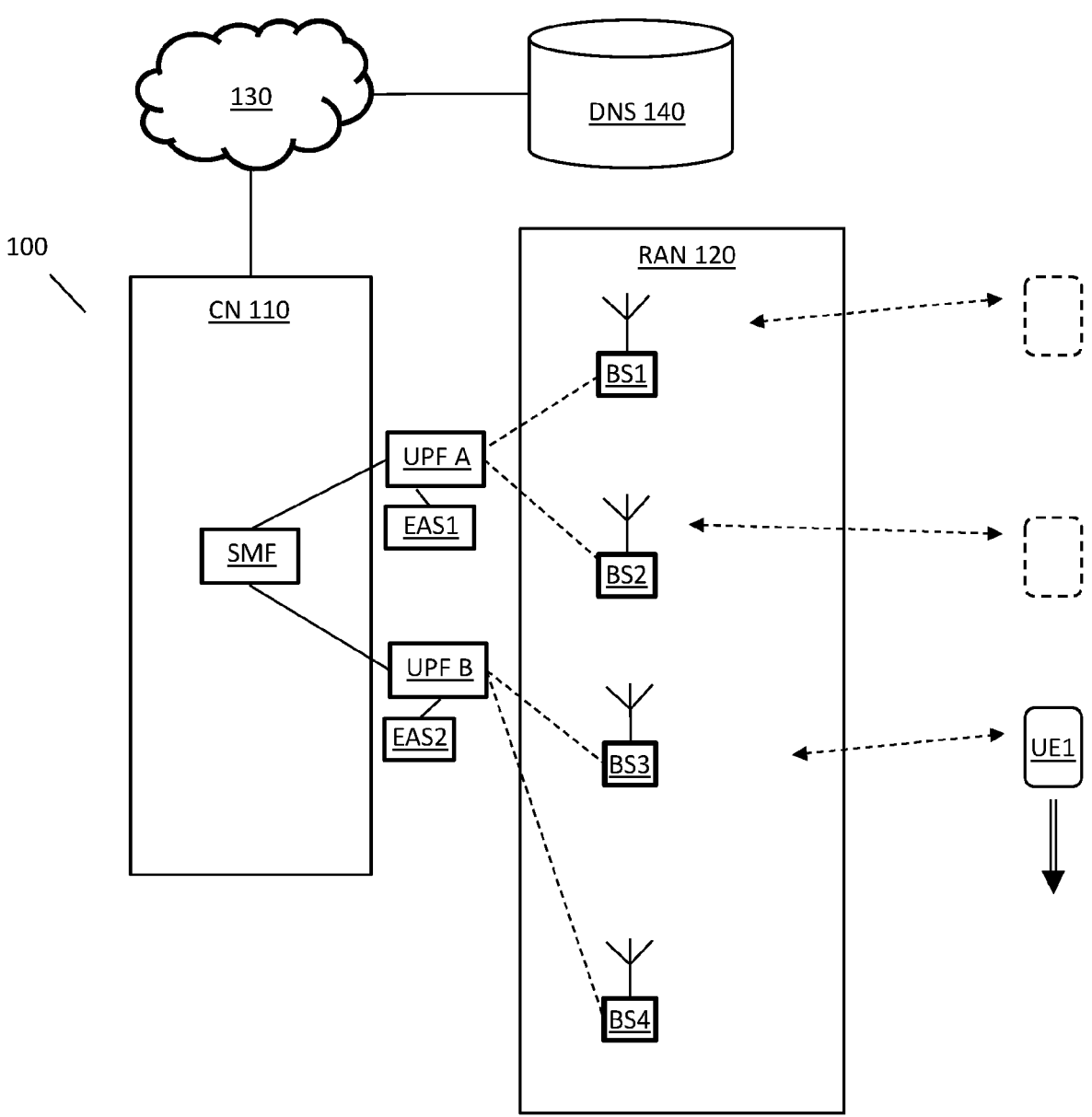
FIG. 1 schematically illustrates a UE operating in a wireless network in an environment comprising Edge servers, in which the proposed solutions may be set out.

In the following description, for purposes of explanation and not limitation, details are set forth herein related to various examples. However, it will be apparent to those skilled in the art that the present disclosure may be practiced in other examples that depart from these specific details. In some instances, detailed descriptions of well-known devices, circuits, and methods are omitted so as not to obscure the description of the present disclosure with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically illustrates a wireless communication scenario, providing an example of a scenario in which the solutions provided herein may be incorporated. The wireless communication system includes a wireless network 100, and a UE1 which is configured to wirelessly communicate with the wireless network 100. The wireless network 100 comprises a core network 110, which is connected to other communication networks 130 such as the Internet. The wireless network 100 further comprises one or more access networks 120, such as a 5G NR (New Radio) access network, usable for communication with UEs of the system. The access network 120 may comprise a plurality of access nodes or base stations, of which base stations BS1-BS4 are illustrated, configured to provide a wireless interface for, inter alia, the UE1. For an NR implementation, the base station may be referred to as a gNB. Each base station comprises a point of transmission and reception, referred to as a Transmission and Reception Point (TRP), which coincides with an antenna of the respective base station. Logic for operating the base station may be configured at the TRP or at another physical location.

The UE1 may be of any device type operable to wirelessly communicate with the network 100 through the base stations BS1-BS4, such as a mobile telephone, computer, tablet, a machine to machine (M2M) device, an IoT (Internet of Things) device or other. The UE1 may further be configured to communicate through other networks (not shown), such as Wi-fi networks, connected to the Internet 130.

As the UE1 moves within connection range of the wireless network, as indicated in the drawing, connection may be set up, or be handed over, between different base stations of the wireless network.

A DNS server 140 is further illustrated, which holds a DNS configuration associated with the wireless network 100. The DNS server 140 is configured to provide addresses, e.g. IP addresses, to Edge computing resources in accordance with the DNS configuration, based on a DNS request comprising a domain name address. The DNS server 140 may thus be configured to identify IP addresses to an ECS, an EES, and/or an EAS, for an application client in the UE1 to use.

In the drawing, an Edge application server EAS1 is illustrated in connection with the first base station BS1 via the UPF (User Plane Function) A, and another Edge application server EAS2 is illustrated in connection with the first base station BS3 via UPF B.

Before discussing various related problems and solutions in accordance with various aspects of the proposed method, the UE1 and a network node will be functionally discussed on a general level.

Figure 2:
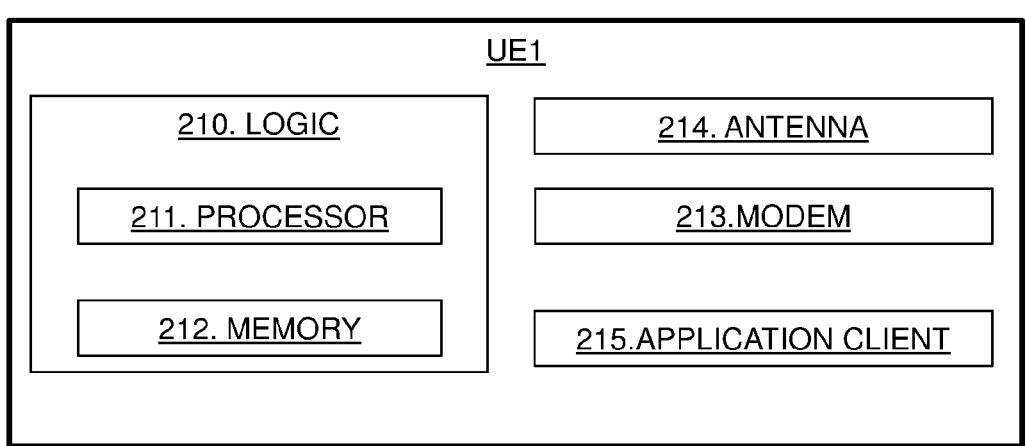
FIG. 2 schematically illustrates a UE configured to operate in accordance with the examples laid out herein.

FIG. 2 schematically illustrates an example of a radio station in the form of UE1 for use in a wireless network 100 as presented herein.

The UE1 comprises a modem 213 for communicating with other entities of the radio communication network 100, such as the base stations BS1-BS4 in various frequency bands. The modem 213 may thus include a radio receiver and transmitter for communicating through at least an air interface.

The UE1 may further comprise an antenna system 214, which may include one or more antenna arrays. In various examples the antenna system 214 comprises different antenna elements configured to communicate with the wireless network 100. The antenna system 214 is connected to the modem 213 for obtaining wireless communication.

The UE1 further comprises logic 210 configured to communicate data, via the modem 213, on a radio channel, to at least the wireless communication network 100.

The logic 210 may include a processing device 211, including one or multiple processors, microprocessors, data processors, co-processors, and/or some other type of component that interprets and/or executes instructions and/or data. The processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage media. For example, the memory storage 212 may include a random access memory (RAM), a dynamic random access memory (DRAM), a cache, a read only memory (ROM), a programmable read only memory (PROM), flash memory, and/or some other type of memory. The memory storage 212 may include a hard disk (e.g., a magnetic disk, an optical disk, a magneto-optic disk, a solid state disk, etc.). The memory storage 212 is configured for holding computer program code, which may be executed by the processing device 211, wherein the logic 210 is configured to control the UE1 to carry out any of the method steps as provided herein. Software defined by said computer program code may include an application or a program that provides a function and/or a process. The software may include device firmware, an operating system (OS), or a variety of applications that may execute in the logic 210.

The drawing further illustrates an application client 215, stored in memory on the UE, which application client may operate in conjunction with an Edge server.

Obviously, the UE1 may include other features and elements than those shown in the drawing or described herein, such as a power supply, a casing, a user interface, sensors, etc., but these are left out for the sake of simplicity.

Figure 3:
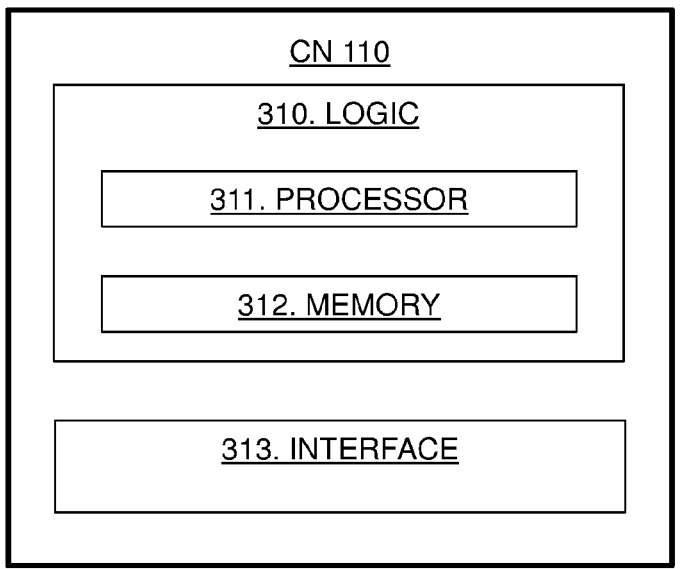
FIG. 3 schematically illustrates a network node configured to operate in accordance with the examples laid out herein.

FIG. 3 schematically illustrates an example of a network node of the wireless network 100. The network node is here referred to as the CN 110, and provides hardware and software to operate the core network 110 of the wireless network. It shall be understood that the network node CN 110 may be distributed in various different elements, which collectively may co-operate to operate the methods proposed herein.

The CN 110 comprises logic 310 configured to control mobility management and data plane communication with UEs through the access network 120. The logic 310 may include a processing device 311, including one or multiple processors, microprocessors, data processors, co-processors, and/or some other type of component that interprets and/or executes instructions and/or data. The processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, the memory storage 312 may include a random access memory (RAM), a dynamic random access memory (DRAM), a cache, a read only memory (ROM), a programmable read only memory (PROM), flash memory, and/or some other type of memory. The memory storage 312 may include a hard disk (e.g., a magnetic disk, an optical disk, a magneto-optic disk, a solid state disk, etc.). The memory storage 312 is configured for holding computer program code, which may be executed by the processing device 311, wherein the logic 310 is configured to control the CN 110 to carry out any of the method steps as provided herein. Software defined by said computer program code may include an application or a program that provides a function and/or a process. The software may include device firmware, an operating system (OS), or a variety of applications that may execute in the logic 310.

The CN 110 may further comprise an interface 313 for communicating with the access network 120, and for realizing a User Plane Function UPF for communication with UEs, and with other networks.

Figure 4:
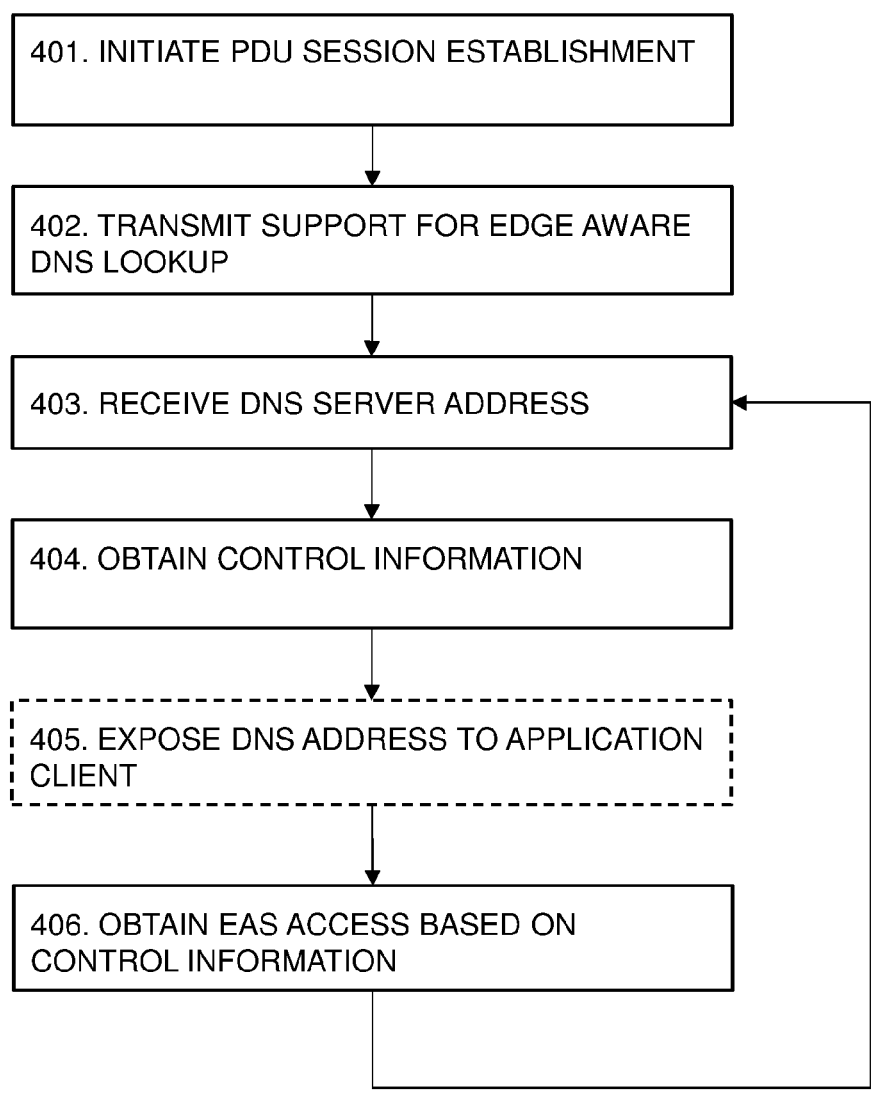
FIG. 4 is a flow chart of a method carried out according to various aspects associated with the proposed solution.

It may be acknowledged that it is an objective that the Edge application client 215 in the UE1 benefits from finding the closest Edge Application Server, EAS. Various features will now be outlined with reference to FIG. 4, relating to the method steps carried out in the UE1, and in parallel to the steps carried out in the base station BS1.

In step 401, establishment of a Protocol Data Unit, PDU, session between the UE1 and the wireless network 100 is initiated.

In step 402, the UE1 transmits a first message to the wireless network 100, during the establishment/modification in step 401, which message indicates UE support for Edge-aware DNS lookup. In this context, the UE1 indicates that it supports Edge Application Aware DNS Lookup, from the modem 213 or Application Client 215 to the wireless network 100. This may be conveyed as a Protocol Configuration Option (PCO) during PDU Session Establishment and/or Modification Procedure, upon registration to the wireless network 110. An Edge-aware DNS server is capable of resolving an FQDN (Fully Qualified Domain Name) to different IP addresses, e.g. based on UE location with respect to validity area.

In step 403, the UE1 receives a second message comprising an address to an Edge-aware DNS server configured to provide an address to an Edge server. This second message may be transmitted during the establishment by a Session Management Function SMF, realized by the core network 110. Today, such a DNS configuration typically comprises identification of a single DNS address provided by the operator, to the DNS server 140. In response to the first message, the wireless network 100 may reply with an address to an additional, or alternative, local DNS server, e.g. tied to operator. Specifically, the second message may be configured, based on the first message indicating UE support, to identify an Edge-aware DNS server configured to resolve an FQDN to an IP address for an Edge server. In particular, the Edge-aware DNS server may be configured to resolve an FQDN to an IP address for an Edge server dependent on UE location with respect to validity area.

In some embodiments, the address to the Edge-aware DNS server enables the UE1 to obtain control information for Edge server access. In some embodiments, the address to the Edge-aware DNS server enables the UE1 to obtain control information for Edge server access based on UE presence with respect to a validity area. In some embodiments, a validity of the address to the DNS server is associated with location of the UE1 with respect to the validity area. This way, reconfiguration of the UE1 with respect to edge server access may be obtained based on mobility of the UE1.

In step 404, the UE1 may obtain control information from the wireless network 100 for Edge server access based on UE presence with respect to a validity area. By means of this control information, the UE is configured to set up or adapt Edge server access based on mobility. Various embodiments associated with using the control information will be outlined further below.

In step 405, the UE1 may expose the address to the DNS server to an Edge application client 215, via an application interface (API) at the modem 213 of the UE. Exposure of the DNS address to the application environment may e.g. be carried via AT commands. By this arrangement, the DNS functionality is relieved from the OS to the application layer, and provides signaling that works to the application layer. All applications support communications to either IP addresses or FQDNs (Fully Qualified Domain Name). Based on this solution, in step 406 the application is allowed to gain knowledge of how to utilize 3GPP specific DNS lookup, and may thus be configured to first carry out DNS lookup and then use the existing interface/APIs for all communications. Due to mobility of the UE the network may need to notify the UE about new DNS, new EAS or that the session with the EAS/ECS needs to be established again, which may lead to repeat from step 403 as indicated. A benefit of this solution is that there is no change or special rules, polices, filters etc. that needs to be supported in the IP stack or any other modifications in the mobile operating system (OS). This solution is not dependent of any URSP (UE Route Selection Policy) etc. This also allows other applications and the OS in the UE to use high security for all other DNS lookups since it is only the Edge Specific DNS lookup's that needs to use low security (no security at all) for the DNS request.

DNS specifications supports using location for finding an IP address that is nearby you (based on location) but the validity time (TTL) is independent of changed location. According to various embodiments, it is therefore suggested to include the same signaling as providing the Edge-aware DNS to the UE application for when re-evaluation of the DNS lookup should be done. As indicated for step 404, the UE1 obtains control information from the wireless network 100 for Edge server access based on UE presence with respect to a validity area. In some embodiments, said validity area identifies an access network portion of the wireless network, such as a list of cell identities of access nodes (base stations) of the wireless network 100. From one perspective connection via a number of access nodes may be served by a common User Plane Function (UPF), such as UPF a and UPF B in FIG. 1. In some embodiments, a Data Network Access Identifier, DNAI, associated with such an UPF, identifies the validity area. In yet another embodiment, the validity area defines a geographical area, such as by means of a geofence. location with respect to such a validity area may be determined based on positioning carried out by either the UE, e.g. using GNSS, or by RAT positioning in a location server (not shown) of the wireless network 100, e.g. based on OTDOA (Observed Time Difference Of Arrival).

In some embodiments, obtainment of control information in the UE1 involves reception from the wireless network 100 of an identification of the validity area. This identification may be received in or in conjunction with the second message of step 402, or separately. The UE1 is thereby configured to autonomously perform DNS lookup responsive to leaving the validity area. The identification may for example comprise a list of Cell ID's that the UE1, wherein the UE1 is allowed to use the same DNS result as long as it is within that area, such as being served by one of those cells. If the UE detects it is outside of that area, e.g. by preparing to or having completed a handover to a cell not included in the validity area, a new PDU Session Establishment/Modification is required to obtain a DNS address. This may result in the subsequent obtainment of a new IP address to an EAS, which is more locally more beneficial, such as a change from EAS 1 to EAS 2. This embodiments provide the benefit of the UE1 obtaining update of information associated with Edge server access, with limited signaling.

In other embodiments, the control of the UE1 is maintained in the wireless network, wherein the control information is transmitted to the UE1 based on location of the UE1 with regard to the validity area, e.g. responsive to the UE1 leaving the validity area. The SMF may in such an embodiment send the control information in the form of a new PDU Session Modification message, corresponding to the second message mentioned above, to the UE1, indicating that the application in the UE1 needs to re-evaluate the DNS lookup, instead of relying only on TTL. This way the wireless network 100, such as by means of the SMF, may trigger the UE1 to obtain a new EAS IP address, even if the same DNS server is indicated. Alternatively, or additionally, the control information may provide a new DNS server IP address. These embodiments provide the added benefit of allowing the wireless network 100 to trigger the UE1 to obtain control information which updates the UE1 when edge server information is changed, such as when an Edge server goes down.

In certain situations, an Edge system may be reconfigured to change EAS for a certain application task, without changing the IP address to the EAS. In other words, from the perspective of the application client 215 in the UE1, there is no change in which IP address to use in communication with the EAS, but in reality, the IP address for an EAS, e.g. EAS 1, may be routed to different EAS, e.g. EAS 2. In such a scenario, and where this is known to the CN 110, control information may provide that a new session is to be set up, wherein the control information triggers the UE1 to re-establish an existing session-based communication with an EAS. The application then starts new TCP handshake process. The Edge application 215 in the UE1 thus uses the control information as a notification or trigger to the application client 215, to know when all session-based protocol needs to be re-established without having to wait for re-transmissions and time-outs.

A benefit of allowing the wireless network 100, such as by means of the SMF, provide control information to trigger the UE1 to take one or more of the mentioned actions, the Edge application client 215 in the UE1 will use the DNS configuration for all DNS lookups and then the DNS Client of the OS/IP-Stack is not used. This allows special limitations to not use any security. This way, the operator is able to handle the DNS query.

As noted, standard DNS messages include TTL which means that the reported IP address is valid during that time and this time does not consider changed location of the UE. For Edge Computing, when the UE1 that moves from a first serving EAS 1 to a second serving EAS 2, the UE 1 needs to be updated with the new IP address of the new serving Edge Application Server EAS 2, so the actual need for updates is based on changed location, not expired time that is supported by DNS systems. The proposed solution as outlined above solves this problem.

Another part that has previously not been solved is that when the UE1 has resolved the FQDN to an IP address and for example uses that IP address, then the UE is not expected to do any more DNS query. Current solutions for extreme low latency applications seems to be to start with may re-transmissions until finally a time-out to be able to start over with a DNS query if the TTL has expired and then set up the communications again. The proposed solution, on the other hand, provides the benefit of signaling to the application layer, by allowing the application layer to gain access to the DNS address, so the application knows when to re-establish a session without any delays. Another benefit is that this allows the operator to provide different DNS server addresses to the UE based on the UE's location which means that the operator may use several simple standard DNS servers in different locations.

Various aspects of the proposed solution have been outlined in the foregoing. Except for where they are clearly contradictory, these examples may be combined in any way.

The invention claimed is:

1. A method for use in a User Equipment (UE) for obtaining connection to an Edge server, the method comprising:

initiating establishment of a Protocol Data Unit (PDU) session with a wireless network;

transmitting, to the wireless network during the establishment, a first message indicating UE support for Edge-aware Domain Name System (DNS) lookup;

receiving, from the wireless network during the establishment, a second message comprising an address to an Edge-aware DNS server configured to provide an address to the Edge server; and exposing the address of the Edge-aware DNS server to an Edge application environment in the UE.

2. The method of claim 1, wherein a validity of the address to the Edge-aware DNS server is associated with location of the UE with respect to a validity area.

3. The method of claim 1, comprising: obtaining control information for Edge server access based on UE presence with respect to a validity area.

4. The method of claim 3, wherein the control information is received from the wireless network responsive to the UE leaving the validity area.

5. The method of claim 4, wherein said control information comprises updated Edge-aware DNS server address information.

6. The method of claim 4, comprising: performing DNS look-up, responsive to obtaining the control information.

7. The method of claim 4, comprising: re-establish an existing session-based communication with an Edge server, responsive to obtaining the control information.

8. The method of claim 3, wherein the control information comprises an identification of the validity area, the method comprising: performing DNS lookup responsive to leaving the validity area.

9. The method of claim 2, wherein said validity area identifies an access network portion of the wireless network.

10. The method of claim 2, wherein the validity area identifies cell identities of access nodes of the wireless network.

11. The method of claim 2, wherein a Data Network Access Identifier (DNAI) identifies the validity area.

12. The method of claim 1, wherein exposing the address of the Edge-aware DNS server to an Edge application environment comprises: exposing the address to the Edge-aware DNS server to an Edge application client.

13. A User Equipment (UE) configured for obtaining connection to an Edge server, the UE comprising:

a modem for communicating with a wireless network;

logic circuitry configured to control the modem to:

initiate establishment of a Protocol Data Unit (PDU) session with the wireless network;

transmit, to the wireless network during the establishment, a first message indicating UE support for Edge-aware Domain Name System (DNS) lookup;

receive, from the wireless network during the establishment, a second message comprising an address to an Edge-aware DNS server configured to provide an address to the Edge server; and expose the address of the Edge-aware DNS server to an Edge application environment in the UE.

* * * * *